UNITED STATES PATENT OFFICE 2,022,218

PROCESS OF PREPARING THE TETRASULPHURIC ACID ESTER OF LEUCO-1,2,2',1'-ANTHRAQUINONE AZINE

Georg Rösch, Cologne-Mulheim, Josef Haller, Leverkusen-Wiesdorf, and Fritz Helwert, Mannheim, Germany, assignors, by mesne assignments, to Durand & Huguenin A.-G., Basel, Switzerland, a corporation of Switzerland No Drawing. Application December 15, 1932, Serial No. 647,494. In Germany December 29, 1931

4 Claims. (Cl. 260—31)

The present invention relates to a process of preparing the tetrasulphuric acid ester of leuco-1,2,2'.1'-anthraquinoneazine.

In accordance with the invention the tetrasulphuric acid ester of leuco-1,2,2',1'-anthraquinone azine is obtained in an especially smooth and simple manner by reacting upon the leuco sulphuric acid ester of anthraquinone-beta-sulphamic acid corresponding to the probable formula:—

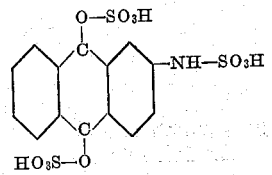

or a salt of this compound with lead dioxide or a metal ferric cyanide, preferably an alkali metal- or alkaline earth metal ferric cyanide.

It is a characteristic feature of our invention that this oxidation reaction is performed not in an acid, but in a neutral or alkaline aqueous medium.

During the reaction sulphuric acid is split off. Care must, therefore, be taken that a sufficient amount of an alkali is added in order to avoid an acid reaction of the reaction mixture. Advantageously, a somewhat larger amount of the alkali is applied, especially when a ferric cyanide is used as the oxidizing agent. Suitable alkalies are those which are inert to the oxidizing agents in question under the conditions of working, more particularly, the hydroxides or basically reacting salts of ammonium or of alkali- or alkaline earth metals, such as $NH_4OH$, $KOH$, $NaOH$, $LiOH$, $Ca(OH)_2$, $Ba(OH)_2$, alkali metal- or ammonium carbonates or -bicarbonates, -acetates, -phosphates etc.

The temperature, at which reaction takes place, varies within the widest limits. Normal or even lower temperatures will be operable, but the reaction is accelerated by heating the reaction mixture up to its boiling point. The reaction is likewise operable at still higher temperatures, but the application of the latter is unnecessary and troublesome, since at temperatures above the boiling point of the reaction mixture, the application of superatmospheric pressure will be inavoidable. Preferred temperature ranges are those between about 50 and about 95° C. Rather high temperatures are generally desirable, when a ferric cyanide is applied as the oxidizing agent, whereas with lead dioxide the reaction is completed quickly already at lower temperatures.

The reaction takes place most probably according to the equation:—

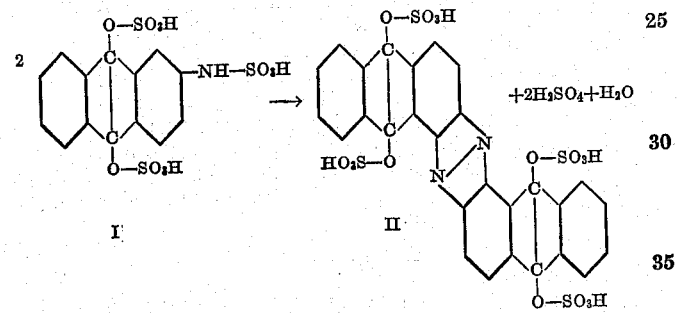

It appears from this equation that for the complete transformation of compound I into compound II an amount of the oxidizing agent at least sufficient to yield 1½ oxygen atoms on one mol of the starting material should be applied. An excess of the oxidizing agent is advantageous.

The reaction is finished as soon as the addition of sodium nitrite and hydrochloric acid to a test portion taken from the reaction mixture no longer causes a red coloration.

The isolation of the reaction product thus obtained may be performed in the usual manner, for example, by salting out with sodium chloride, potassium chloride or the like. It may be used for dyeing and printing purposes in the usual manner, for example, by impregnating fibres with the ester by the aid of a dye bath or a printing paste, and splitting off the ester on the fibre by means of a mineral acid in the presence of an oxidizing agent. Dyeings and printings of N-dihydro-1,2,2',1'-anthraquinone azine are thus obtained.

The following examples illustrate the invention, without, however, restricting it thereto, the parts being by weight:—

The leuco sulfuric acid esters of anthraquinone-beta-sulfamic acid serving as starting material in the present process can be prepared by causing chlorosulfonic acid to react upon beta-aminoanthrahydroquinone as described in our U. S. Patent 1,855,289.

*Example 1*

A solution of 29 parts of the potassium salt of the 2-sulphamic acid of anthrahydroquinone-9,10-disulphuric acid ester 50 parts of potassium carbonate, 50 parts of potassium ferric cyanide in 750 parts of water is heated to boiling for a quarter of an hour to half an hour. The reddish-brown coloration of the reaction mixture turns hereby to orange, and a test portion, diluted with water, shows a distinct, green fluorescence. The potassium salt of the tetra-leuco-sulphuric acid ester of 1.2.2'.1'-anthraquinone azine is salted out by the addition of $K_2CO_3$ as a yellow crystalline precipitate, which is then filtered off with suction, dissolved in some water and again salted out. The potassium salt of the tetra-leuco-sulphuric acid ester is thus obtained in fine yellow needles and in a very good yield.

The tetra-leuco-sulphuric acid ester dissolves in water with a yellow coloration and with magnificent green fluorescence. On acidifying the solution with mineral acid, a violet substance is obtained, which dissolves in water on the addition of sodium carbonate with a red coloration. By the action of acid oxidizing agents or also by a treatment with dilute mineral acid in the presence of certain salts, such as ferrous sulphate or cuprous sulphate, the N,N-dihydro-1,2,2',1'-anthraquinone azine is obtained in solution or on the fibre from the yellow tetra-leuco-sulphuric acid ester as well as from the violet product resulting from the action of the mineral acids.

In the oxidation process the alkali carbonate can be substituted by other alkaline agents, such as for example by the hydroxides of the alkali- or alkaline earth metals.

*Example 2*

A solution of 78 parts of the sodium salt of the 2-sulphamic acid of anthrahydroquinone-9,10-disulphuric acid ester 15.9 parts of sodium carbonate in 200 parts of water is mixed with 287 parts of a paste containing 37.8% of lead dioxide and stirred for 4 hours at a temperature of between about 60 and about 65° C. Thereupon the solution is filtered off by suction, and from the orange colored filtrate the sodium salt of the tetra-leuco-sulphuric acid ester of 1,2,2',1'-anthraquinone azine is isolated either by salting out or by evaporating to dryness. The ester shows the same properties as that described in Example 1.

The oxidation can also be performed in neutral solution or instead of the alkali carbonates the hydroxides of the alkali- or alkaline earth metals, ammonia or salts of weak acids such as boric acid, or salts of organic acids, such as those of oxalic acid, acetic acid etc. may be applied. The tetra-leuco-sulphuric acid ester may also be obtained, when performing the oxidation at room temperature and on prolonged stirring. On the other hand, the reaction process may be shortened by heating the reaction mixture to its boiling point.

*Example 3*

An aqueous solution of 50 parts of the calcium salt of the 2-sulphamic acid of anthrahydroquinone-9,10-disulphuric acid ester and 40 parts of sodium oxalate is heated to boiling. Thereupon 100 parts of pulverized lead dioxide are rather quickly added while thoroughly stirring, and the oxidation is finishd in this manner in a few minutes only. From the intensely yellow colored filtrate the salt of the tetra-leuco-sulphuric acid ester is isolated in the manner described before.

We claim:

1. The process which comprises reacting upon a compound of the formula:—

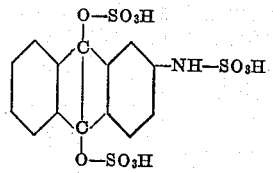

with an oxidizing agent selected from the group consisting of alkali- and alkaline earth metal ferric cyanides and lead dioxide in a non-acid aqueous medium.

2. The process which comprises reacting upon a compound of the formula:—

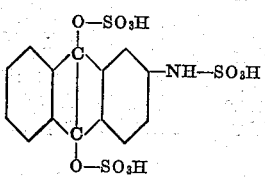

with an oxidizing agent selected from the group consisting of alkali- and alkaline earth metal ferric cyanides and lead dioxide in an aqueous medium rendered alkaline by the addition to the reaction mixture of a compound of the group consisting of the hydroxides and alkaline reacting salts of ammonium and the alkali- and alkaline earth metals.

3. The process which comprises reacting upon a compound of the formula:—

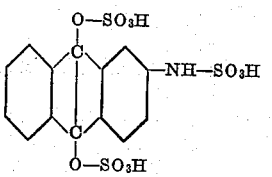

with an oxidizing agent selected from the group consisting of alkali- and alkaline earth metal ferric cyanides and lead dioxide in a non-acid aqueous medium at a temperature between about 50 and about 95° C., the oxidizing agent being applied in an amount at least sufficient to yield 1½ oxygen atoms on 1 mol of the starting material.

4. The process which comprises reacting upon a compound of the formula:—

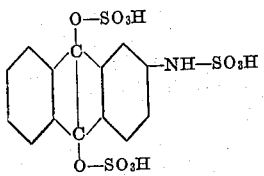

with lead dioxide in an aqueous medium rendered alkaline by the addition to the reaction mixture of a compound of the group consisting of the hydroxides and alkaline reacting salts of ammonium and the alkali- and alkaline earth metals, at a temperature between about 50 and about 95° C., the lead dioxide being applied in an amount at least sufficient to yield 1½ oxygen atoms on 1 mol of the starting material.

GEORG RÖSCH.
JOSEF HALLER,
FRITZ HELWERT.